Patented May 12, 1953

2,638,434

UNITED STATES PATENT OFFICE 2,638,434

TETRACHLOROGLYCOLURIL DERIVATIVES AS CHLORINE LIBERATORS IN OINTMENTS

Homer B. Adkins, Madison, Wis., assignor to the United States of America as represented by the Secretary of the Navy No Drawing. Application April 17, 1943, Serial No. 483,500

8 Claims. (Cl. 167—63)

The present invention relates to protective and therapeutic ointments and more particularly to an ointment of this character which contains a compound having a large proportion of available chlorine.

Ointments which slowly evolve nascent chlorine are useful for various purposes as bactericides, fungicides and the like. Heretofore ointments of this character have been produced by incorporating a chloramide such as dichloramine-T (N-dichloro-p-toluene sulfonamide) in an oleaginous base to produce a composition suitable for application to affected areas of the body. While ointments of this type are effective for the intended purpose when freshly prepared, it has been found that the available chlorine content of the prior compositions falls off rapidly when the material is stored at elevated temperatures. Moreover, the available chlorine content of prior chloramide ointments is undesirably low.

One of the objects of the present invention is to provide an active chlorine-releasing ointment which is stable over a long period of time at elevated temperatures. Another object is the provision of an ointment of the character described which contains an available chlorine content greater than that of an ointment prepared from dichloramine-T. Other objects and advantages will be apparent as the invention is hereinafter more particularly described.

The foregoing objects may be attained by incorporating a disubstituted tetrachloroglycoluril compound with an anhydrous unguentary base and preferably also with a conventional thickening agent, to form an ointment or salve suitable for application to affected areas of the body.

The tetrachloroglycolurils contemplated by the present invention are of the type:

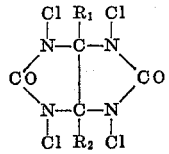

where $R_1$ and $R_2$ are alkyl or aryl groups. Tetrachlorodimethylglycoluril constitutes the preferred chloramide of the present invention, although closely related compounds, such as tetrachlorodiphenylglycoluril, tetrachloromethylphenylglycoluril and the like, are also particularly efficacious in these ointments. Compounds of this general type are more particularly described and claimed in the copending application of Jonathan W. Williams, Ser. No. 472,651, filed January 15, 1943. They may be prepared either by the method described in the Willams application or by the method described and claimed in my copending application Ser. No. 483,499, filed of even date herewith.

A suitable anhydrous unguentary base for the foregoing chloramides may comprise an oleaginous glyceride ester, for example, triacetin. The thickening agent may consist of any of the usual agents employed for this purpose in the cosmetic and pharmaceutical industry, for example, zinc stearate, magnesium stearate, cellulose butyrate-acetate and the like. Of these thickening agents, magnesium stearate and cellulose butyrate-acetate are preferred, inasmuch as the resulting compositions appear to be somewhat more stable.

The proportions of the various components may, of course, be varied within wide limits, depending on the physical properties desired in the finished product. However, the preferred ointment of the present invention consists, for example, of approximately 11 to 15% magnesium stearate, 34 to 35% tetrachlorodimethylglycoluril and 50–54% U. S. P. triacetin. In preparing the ointment, the chloramide is preferably ground to a powder such that it will all pass through an 80 mesh screen. The powdered chloramide and stabilizing agent (e. g., U. S. P. magnesium stearate) are thoroughly mixed with each other and thereafter the mixture is slowly added to, and completely mixed with, U. S. P. triacetin, this being accomplished, for example, by means of the type of mixing apparatus used in the preparation of vanishing creams in the cosmetic trade. The mixture is then put through a conventional ointment mill and may be packaged in any convenient manner, for example, collapsible metal tubes having a resinous or wax lining. The resulting compositon is an ointment of the vanishing cream type.

A sample of cream prepared in the foregoing manner showed no loss of available chlorine when stored at 50° C. for over a month. A corresponding ointment containing dichloramine-T as the chloramide was found to lose from 5 to 15% of its available chlorine when stored at 50° C. for thirty days. An ointment of the non-vanishing cream type, prepared from 5% cellulose butyrate-acetate, 35% tetrachlorodimethylglycoluril and 65% triacetin was even more stable than that containing the magnesium stearate as the thickening agent. Thus a sample of the ointment containing the cellulose butyrate-acetate as a thickening agent showed a loss of only 0.2% available chlorine after seven days of storage at 75° C. A sample of a corresponding cream wherein zinc stearate was employed as the thickening agent showed a loss of 3 or 4% of available chlorine after seven days' storage at 75° C. whereas the dichloramine-T ointment of the prior art showed a loss of about 67% of available chlorine under the same test conditions.

In the foregoing detailed description of the present invention it will be apparent that many variations may be made without departing from the spirit or scope thereof, and the invention should not be limited other than as defined by the appended claims.

I claim:

1. An ointment comprising a chloramide dispersed in an anhydrous unguentary base, said chloramide including a compound having the formula:

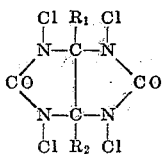

where $R_1$ and $R_2$ are selected from the group consisting of alkyl and aryl radicals.

2. An ointment comprising tetrachlorodimethylglycoluril dispersed in an anhydrous unguentary base.

3. An ointment comprising tetrachlorodimethylglycoluril, an anhydrous unguentary base, and a thickening agent.

4. The composition of claim 3 wherein said base comprises triacetin.

5. The composition of claim 3 wherein said thickening agent comprises magnesium stearate.

6. The composition of claim 3 wherein said thickening agent comprises cellulose acetate-butyrate.

7. An ointment of the vanishing cream type comprising approximately 11 to 15% magnesium stearate, 34 to 35% tetrachlorodimethylglycoluril and 50 to 54% triacetin.

8. An ointment comprising approximately 5% cellulose butyrate-acetate, 35% tetrachlorodimethylglycoluril and 65% triacetin.

HOMER B. ADKINS.

References Cited in the file of this patent

UNITED STATES PATENTS

| Number | Name | Date |
|---|---|---|
| 2,136,173 | Steingroever | Nov. 8, 1938 |
| 2,157,831 | Minaeff | May 9, 1939 |
| 2,249,523 | Hiatt | July 15, 1941 |

OTHER REFERENCES

Berichte Deutscher Chemischen Ges. 43 (1910) pp. 1992–93. (Copy in Patent Office Library.)

New and Nonofficial Remedies, 1939, page 257. (Copy in Div. 43.)

The Merck Index, 5th edition (1940), page 331. (Copy in Div. 43.)